United States Patent [19]

Hagiwara

[11] Patent Number: 4,529,938
[45] Date of Patent: Jul. 16, 1985

[54] HIGH FREQUENCY INDUCTION METHOD FOR LOCATING THE INTERFACE BETWEEN FORMATIONS HAVING THE SAME RESISTIVITY

[75] Inventor: Teruhiko Hagiwara, Houston, Tex.

[73] Assignee: Shell Oil Company, Houston, Tex.

[21] Appl. No.: 465,946

[22] Filed: Feb. 14, 1983

[51] Int. Cl.³ .............................................. G01V 3/28
[52] U.S. Cl. ................................................... 324/339
[58] Field of Search ............... 324/329, 338, 339, 341, 324/233

[56] References Cited

U.S. PATENT DOCUMENTS

| | | | |
|---|---|---|---|
| 2,220,070 | 11/1940 | Aiken | 324/339 |
| 2,220,788 | 11/1940 | Lohman | 324/339 |
| 2,264,318 | 12/1941 | Lee | 324/339 |
| 3,249,858 | 5/1966 | Gouilloud | 324/339 |
| 4,278,941 | 7/1981 | Freedman | 324/341 |
| 4,427,941 | 1/1984 | Riedesel et al. | 324/338 X |

FOREIGN PATENT DOCUMENTS 0798671  1/1981  U.S.S.R. .............................. 324/338

*Primary Examiner*—Gerard R. Strecker

[57] ABSTRACT

A method for locating the interface between two formations wherein the two formations have different dielectric constants but may have the same resistivity. The method utilizes a high frequency induction logging tool having at least two receivers positioned equal distances on either side of the transducer. The difference in the phase angle and the logarithm ratio of the amplitudes between the two receiver signals are recorded with respect to depth to locate the interface.

4 Claims, 3 Drawing Figures

HIGH FREQUENCY INDUCTION METHOD FOR LOCATING THE INTERFACE BETWEEN FORMATIONS HAVING THE SAME RESISTIVITY

BACKGROUND OF THE INVENTION

The present invention relates to high frequency induction logging systems, and more particularly, to a method for using a high frequency induction logging device (HFIL) to locate the position of an interface between two different zones having different dielectric constants even if two zones have the same resistivity. For example, one zone may be a fresh water zone while the second zone is a hydrocarbon zone. The invention is also useful in determining the overall thickness of a hydrocarbon bearing zone which is bounded on the top and bottom by zones having different dielectric constants even if all three zones have the same resistivity.

In U.S. Pat. No. 4,278,941, which is incorporated in the present specification for background purposes, there is described a high frequency induction logging method and apparatus utilizing a transmitter and at least two receivers spaced to one side of the transmitter. The voltage signals induced in the two receivers are measured to determine the attenuation and phase shift between the two receivers. From the phase shift and attenuation one can derive the dielectric constant and resistivity of the formation. The patent also describes the change in the phase difference as the tool passes an interface. As shown in the patent, the accurate determination of the location of the interface is difficult if not impossible without knowledge of both the dielectric constant and resistivity of the formations.

U.S. Pat. Nos. 4,185,238 and 4,209,747 describe high frequency induction logging devices in which two receiver coils are used at each of two separate locations. One pair of receiver coils is used to determine the attenuation nearer to the transmitter while the second pair of receiver coils is used to determine the phase shift at a position farther removed from the transmitter. The patents describe the effect of the borehole on the induced current and how the receiver coils respond to different parts of the formation if one was measuring the difference in amplitude as contrasted to the difference in phase. The amplitude of the signal is affected more by the far or remote portions of the formation surrounding the borehole while the phase is affected more by the near or adjacent portions of formations. Thus, in order to provide a logging tool that will accurately measure both the difference in amplitude and phase shift the patent suggests that the difference in amplitude be measured at a near set of receiver coils while the difference in phase be measured at a far or remote set of receiver coils. From the above, it can be seen that while the two patents provide a more accurate measurement of the dielectric constant of the formations, they do not provide a more accurate definition of the interface nor the thicknesses of the various formations. The two patents are the same as U.S. Pat. No. 4,278,941 in that the receiving coils are all positioned to one side of the transmitter.

SUMMARY OF THE INVENTION

The present invention provides a configuration for a high frequency induction logging tool which provides accurate information regarding the location of various interfaces and the thicknesses of various formations. The method does not require any knowledge of the dielectric constants or the resistivity of the formation nor does it require the use of nomograms or other interpretive tools for predicting the location of the interface. The method utilizes a HFIL tool having a transmitter positioned between two receiving coils spaced equal distances on opposite sides of the transmitter. This configuration provides negative and positive responses in both the phase shift and ratio of the voltage signals of the two receiver coils as the transmitter passes the interface.

The peaks in the negative and positive responses indicate the location of the interfaces while the distance between the two peaks is a measure of the thickness of the formation. Either the difference in phase or phase shift between the signals produced at the two receiver coils or a log ratio of the amplitude of the voltage signals produced at the receiver coils can be recorded with relation to the position of the tool in the borehole to obtain an accurate indication of the interface and the thickness of the formation.

BRIEF DESCRIPTION OF THE DRAWINGS

The invention will be more easily understood from the following detailed description when taken in conjunction with the attached drawings in which.

DESCRIPTION OF PREFERRED EMBODIMENTS

Figure 1:
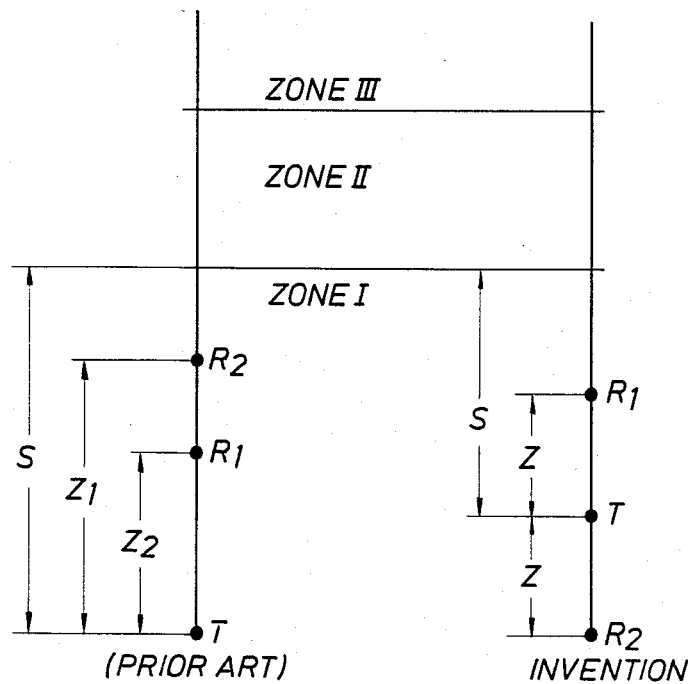
FIG. 1 is a diagrammatic representation of the tool configuration of the prior art and the present invention.

Referring now to FIG. 1 there is shown on the left the diagrammatic representation of the prior art logging tool having a transmitter T and two receivers, $R_1$ and $R_2$ spaced to one side of the transmitter. Also shown are three separate zones in the formation indicated by I, II and III having the same resistivity, for example 200 ohm meters with the formations I and III having the same dielectric constant while the formation II has a different dielectric constant. For example, if one assumes that $\epsilon_0$ is the dielectric constant of a vacuum, then $\epsilon_1/\epsilon_0$ would equal $\epsilon_3/\epsilon_0 = 25$ while the ratio $\epsilon_2/\epsilon_0$ for formation II would be five. These numbers would be representative for the values found in fresh water and hydrocarbon bearing sands. Shown on the right in FIG. 1 is the tool configuration used in the present invention in which the transmitter T is located between the two receiving coils, $R_1$ and $R_2$, spaced equal distances Z from the transmitter T. Z is at most equal to twice the thickness of the thinnest zone II to be detected. If the thickness of the zone is much less than one half the spacing, the zone cannot be accurately located.

From an inspection of the tool configuration shown in FIG. 1, it is seen that with the prior art device as the receivers approach the interface, first one and then the other is affected by the change in the dielectric constant of the two zones. Thus, the phase difference as well as the ratio of the amplitudes changes very slowly as will be explained later. In contrast, as the tool of the present invention approaches the interface the receiver $R_1$ would be affected first while the receiver $R_2$ is not affected and thus the phase difference and the ratio of the amplitudes will change dramatically. The difference in the two signals will, of course, reach a maximum when the transmitter is located at the interface. In this configuration the receiver $R_1$ will be affected to the maximum while the receiver $R_2$ is only slightly affected. Thus, the log response of both the phase difference and the amplitude ratio will have maximum values. As the tool progresses upwardly, the log values will be reduced until they cross the zero axis when the transmitter is located at the exact middle of the second zone. The log values will then assume a polarity opposite to the polarity of the first log values and reach a maximum value when the transmitter is located at the top of zone II.

Figure 2:
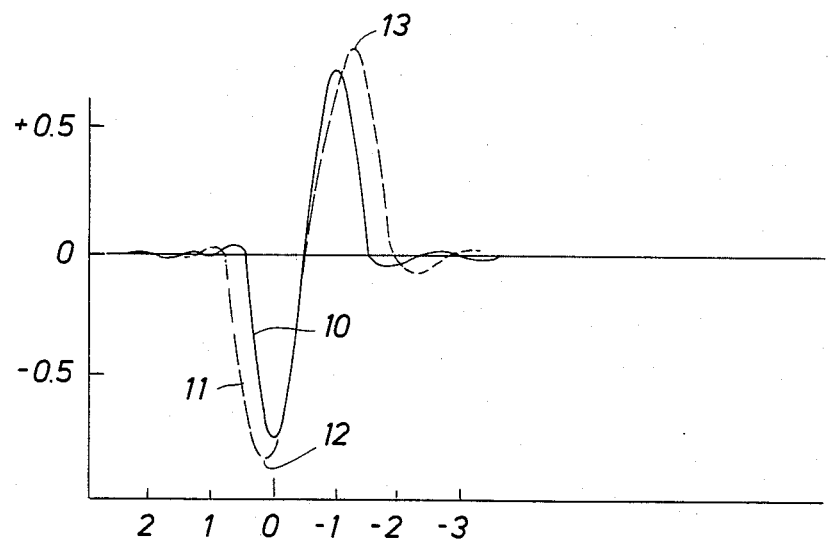
FIG. 2 is a log response of both the phase difference and the logarithm ratio of the amplitude differences of the voltages in the two receiver coils of the present invention.

The above change in the log response is more accurately shown in FIG. 2 in which the value of the logarithmic ratio of the amplitudes is plotted on the vertical axis while distance is plotted on the horizontal axis with the zero position indicating the interface between zone I and II. As can be seen from the drawing, the amplitude ratio curve 10 increases gradually in a negative direction as the tool approaches the interface and reaches a maximum value at the zero position when the transmitter is positioned directly over the interface. The value of the amplitude ratio then decreases and crosses the zero axis at the midpoint between zones I and III and assumes a more positive value reaching a maximum at a minus 1 which is the thickness of the formation. In this example, it has been assumed that the formation has a one meter thickness and that the receivers are positioned 1 meter on either side of the transmitter. The dotted curve 11 in FIG. 2 represents the phase difference of the signals of the receiver. As seen, the value of the phase difference reaches a maximum negative value 12 before the transmitter is positioned over the interface and a positive value 13 after the transmitter has passed the interface between zones II and III. Thus, while the phase difference indicates the limits of the zone thickness of zone II and the positions of the interface corrections must be applied to obtain accurate position thickness measurements.

Figure 3:
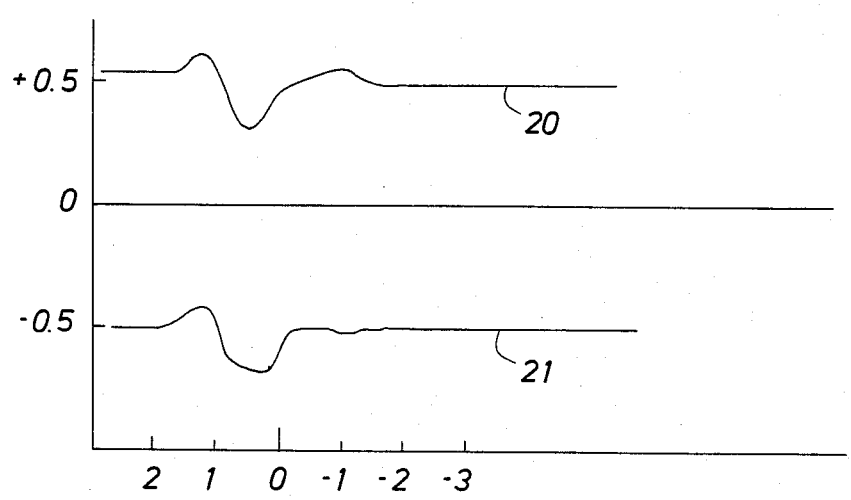
FIG. 3 is a log response of the phase difference and logarithm ratio of the amplitude difference of the voltages in the receiver coils of the prior art tool.

Referring to FIG. 3, there is shown the logarithm response of the amplitude signal 20 and the phase difference signal 21 of the prior art device when logging the same formation. As is easily seen, both responses never obtain the change in amplitude as shown in FIG. 2 for the tool configuration of the present invention. Further, both the phase difference and the amplitude ratio obtain maximum negative values before the tool has reached the interface between zone I and II. In fact, when the transmitter is positioned at the interface the signals have almost reached a constant value. Thus, while the data from the prior art tool is useful in indicating the presence of an interface, its exact location and thickness of the zone cannot be obtained from a direct plot of the tool data. In order to obtain this information, one must first determine the dielectric constants of the formations and then replot the data to obtain the exact location of the interfaces and the thickness of the various zones. In contrast, the present invention provides this information directly without the need of an additional work or computation.

What is claimed is:

1. A method for locating the interface between two formations having the same resistivity but different dielectric constants and determining the thickness of the second formation comprising:
   inducing a high frequency current into the formations at a first position;
   measuring the depth at which said high frequency current was induced into the formation;
   measauring the resulting voltage induced at second and third positions spaced equal distances on each side of said first position;
   determining the difference in phase between the induced high frequency current and each of the measured voltages at said second and third positions to determine the phase of the measured voltages at said second and third positions;
   plotting the difference between the phases at said second and third positions in relation to the depth at which said high frequency current was induced in the formation to determine the interface between said two formations; and
   determining the thickness of said second formation by measuring the distance between negative and positive peaks in the phase difference.

2. The method of claim 1 wherein the second and third positions are located a distance from the first position no more than twice the thickness of the thinnest formation to be located.

3. The method of claim 1 and in addition, determining the relative logarithm ratio of the amplitude of the voltages measured at the second and third locations and plotting the relative logarithm ratio with relation to depth.

4. The method of claim 1, 2, or 3 wherein one formation is water bearing and the other is hydrocarbon bearing.

* * * * *